US009166817B2

(12) United States Patent
Schlansker et al.

(10) Patent No.: US 9,166,817 B2
(45) Date of Patent: Oct. 20, 2015

(54) LOAD BALANCING

(75) Inventors: Michael Schlansker, Los Altos, CA (US); Jean Tourrilhes, Mountain View, CA (US)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 1061 days.

(21) Appl. No.: 13/145,251

(22) PCT Filed: Jan. 19, 2009

(86) PCT No.: PCT/US2009/031403
§ 371 (c)(1),
(2), (4) Date: Jul. 19, 2011

(87) PCT Pub. No.: WO2010/082939
PCT Pub. Date: Jul. 22, 2010

(65) Prior Publication Data
US 2011/0273987 A1    Nov. 10, 2011

(51) Int. Cl.
*H04L 12/801* (2013.01)
*H04L 12/803* (2013.01)
*H04L 12/709* (2013.01)
*H04L 12/46* (2006.01)
*H04L 12/701* (2013.01)
*H04L 12/707* (2013.01)
*H04L 12/753* (2013.01)

(52) U.S. Cl.
CPC .............. *H04L 12/462* (2013.01); *H04L 45/00* (2013.01); *H04L 45/24* (2013.01); *H04L 45/245* (2013.01); *H04L 45/48* (2013.01); *H04L 47/10* (2013.01); *H04L 47/125* (2013.01)

(58) Field of Classification Search
None
See application file for complete search history.

(56) References Cited

U.S. PATENT DOCUMENTS

| 6,980,550 | B1 | 12/2005 | Yip et al. |
| 7,233,575 | B1* | 6/2007 | Jarvis ............................. 370/238 |
| 7,359,383 | B2 | 4/2008 | Wakumoto et al. |
| 2002/0124104 | A1 | 9/2002 | Rappaport et al. |

(Continued)

FOREIGN PATENT DOCUMENTS

EP         0324277      *  7/1989

OTHER PUBLICATIONS

Al-Fares; "A scalable, commodity data center network architecture" University of CA, San Diego. . 2008.

(Continued)

*Primary Examiner* — Christopher Crutchfield
(74) *Attorney, Agent, or Firm* — Van Cott, Bagley, Cornwall & McCarthy

(57) ABSTRACT

A method for load balancing Ethernet traffic within a fat tree network (315, 455) includes randomly assigning incoming messages (510) into hash classes using a hash function (520); allocating the hash classes among uplinks (550); and transmitting the incoming messages on the uplinks (550) according to the hash class. A network switch (515) for load balancing communication flows in a fat tree network (315, 455) includes downlinks (545) and uplinks (550); the network switch (515) being configured to route communication flows among the downlinks (545) and uplinks (550); a hash module (520) which receives a MAC address from a message (510) and outputs a hash address; and a TCAM lookup module (535) which allocates the hash address into a hash class and allocates the hash class to one of the uplinks (550).

20 Claims, 7 Drawing Sheets

(56) References Cited

U.S. PATENT DOCUMENTS

| | | | |
|---|---|---|---|
| 2005/0254490 A1* | 11/2005 | Gallatin et al. | 370/389 |
| 2005/0276263 A1* | 12/2005 | Suetsugu et al. | 370/389 |
| 2008/0084880 A1* | 4/2008 | Dharwadkar | 370/392 |
| 2008/0181103 A1* | 7/2008 | Davies | 370/230 |
| 2008/0285562 A1 | 11/2008 | Scott et al. | |
| 2009/0016332 A1 | 1/2009 | Aoki et al. | |
| 2010/0020806 A1* | 1/2010 | Vahdat et al. | 370/395.31 |
| 2010/0182934 A1* | 7/2010 | Dobbins et al. | 370/254 |

OTHER PUBLICATIONS

International Search Report, PCT/US2009/031403, Aug. 14, 2009, 13 pages.

* cited by examiner

LOAD BALANCING

BACKGROUND

The size and complexity of computer datacenters are increasing to provide support for the global internet. The computer networks which provide communication capability within computer datacenters can be a limiting factor in datacenter performance. Particularly where distributed computing and communication-intensive applications are performed, the network performance should scale with the number of servers that make up the computer datacenter.

However, existing Ethernet-based networks require large switches at the core of the datacenter. High-value Ethernet core switches are often overpriced and not ideally suited for scalable datacenter applications. These switches are not easily replaced by multiple less expensive switches due to Ethernet's poor support for multi-path routing. Additionally, Ethernet's limitations can prevent efficient utilization of network architectures which provide multi-paths between network components.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
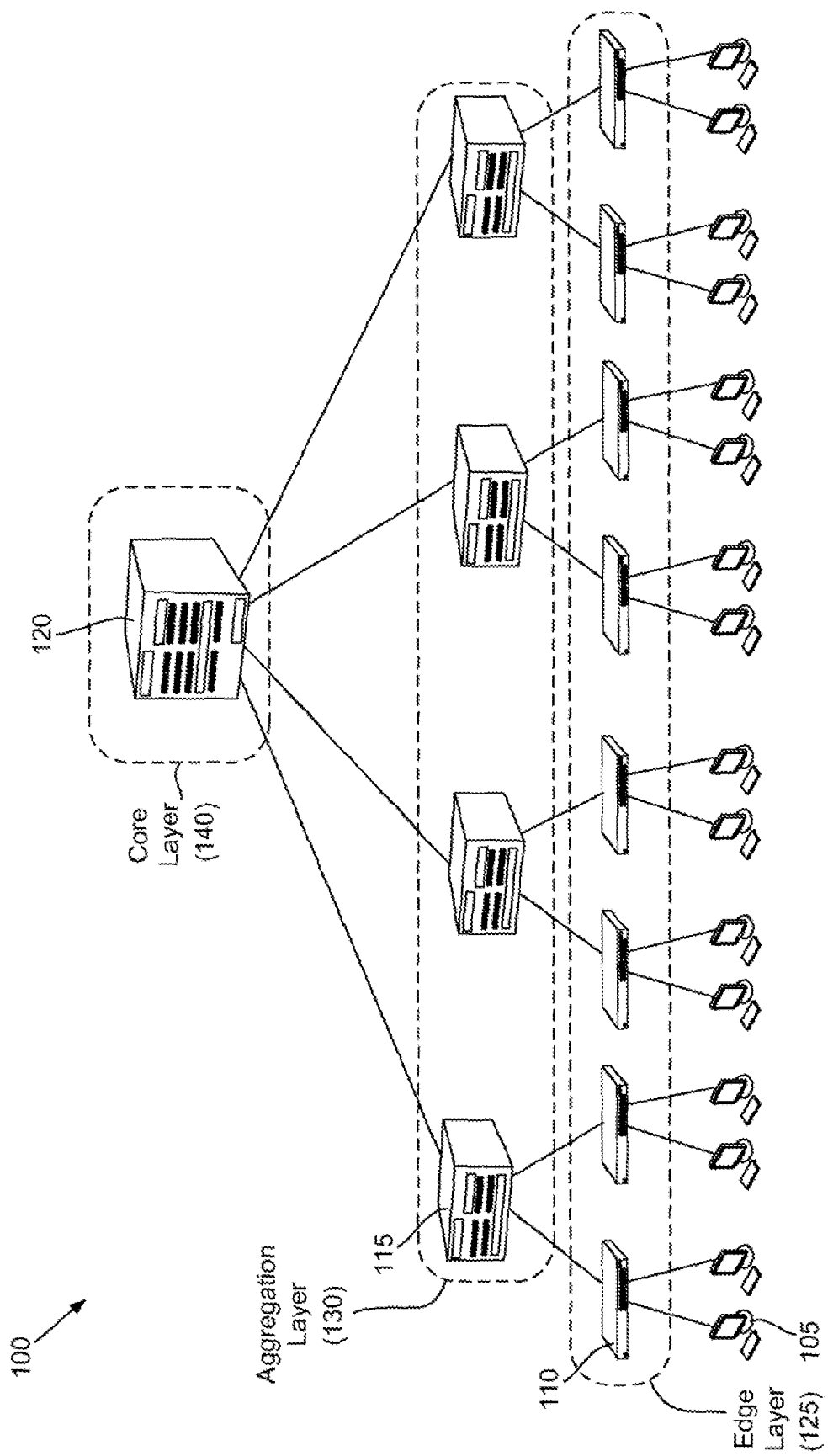
FIG. 1 is a diagram of an illustrative computer network, according to one embodiment of principles described herein.

As discussed above, existing Ethernet-based networks require large switches at the core of the datacenter. These large core switches are expensive and limit the scale and flexibility of the network. These switches are not easily replaced by multiple less expensive switches due to Ethernet's poor support for multi-path routing. Additionally, Ethernet's limitations can prevent efficient utilization of network architectures which provide multi-paths between network components.

Network topologies such as fat trees can provide significantly increased bandwidth capacity, flexibility, and robustness by using redundant core switches. Such topologies provide redundant communications paths which reduces the need for costly root switches. However, due to Ethernet's limitations in supporting multi-path routing, using network topologies which provide redundant communication links between network components can be challenging. These Ethernet limitations arise because of the Ethernet's use of spanning trees. The spanning tree algorithm creates a network that automatically connects all end stations and blocks any redundant links. This provides a number of benefits, including the elimination of cycles which trap messages in endless loops, easily adding new end stations without administrative action, and facilitation of broadcasts needed to locate missing end stations. However, the spanning tree algorithm cannot directly exploit redundant core switches inherent in fat tree topologies to increase the communication capacity of the network. Instead, all but a single core switch are disabled by the spanning tree algorithm.

This specification describes control techniques for fat tree-style fabrics that implement static and dynamic load balancing inside an Ethernet based network. The principles described preserve the traditional benefits of the spanning tree algorithm and allow devices to move throughout the network without administration. According to one illustrative embodiment, enhanced Ethernet switches at the edge of a fabric provide multi-path routing and load balancing for scalable datacenters. These enhanced edge switches are combined with commodity core switches to build scalable networks that allow cost-effective communications within very large scale datacenters.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

FIG. 1 shows one illustrative embodiment of a three tiered computer network (100) which connects a number of end stations (105). Each end station (105) is connected to an edge switch (110). The edge switches (110) are connected in turn to larger aggregation switches (115) which are connected to a core switch (120). Thus, this illustrative computer network (100) has a three tiered structure consisting of an edge layer (125), an aggregation layer (130), and a core layer (140). Using the computer network (100), any end station (105) can communicate with any of the other end stations (105).

The computer network topology and management is important to maximize the performance of the computer network, reduce costs, increase flexibility, and provide the desired stability. Early in the development of computer networks, a number of problems had to be overcome. One of those problems was messages being trapped in endless loop as a result of a minor change to the network topology, such as adding a link or an end station. The trapped message would be repeatedly passed between various network components in a closed cycle that never allowed the message to reach the intended destination. This could generate enormous volumes of useless traffic, often making a network unusable.

The spanning tree algorithm was developed to eliminate potential cycles within a network. The spinning tree algorithm identifies a set of links that spans the network and allows each end station to communicate with every other end station. Redundant links were blocked to prevent loops which could give rise to a cycle. After a spanning tree is identified throughout an entire network, each switch within the network can use a very simple forwarding procedure. When a message is sent from any end station A to any end station B, each switch forwards an incoming message on all active (spanning tree) ports except the port on which the message arrived. This process is called flooding and can be performed with no routing information except information needed to define the active ports. This simple procedure guarantees correct network transmission. Every message sent from an end station A traverses the entire spanning tree and is guaranteed to arrive at end station B, where it is received when B recognizes its target address. Other end stations drop the message addressed to end station B because it is not addressed to them. The use of the spanning tree prevents endless message transmission. When a message reaches the end of the spanning tree, no further message transmission occurs.

Figure 2:
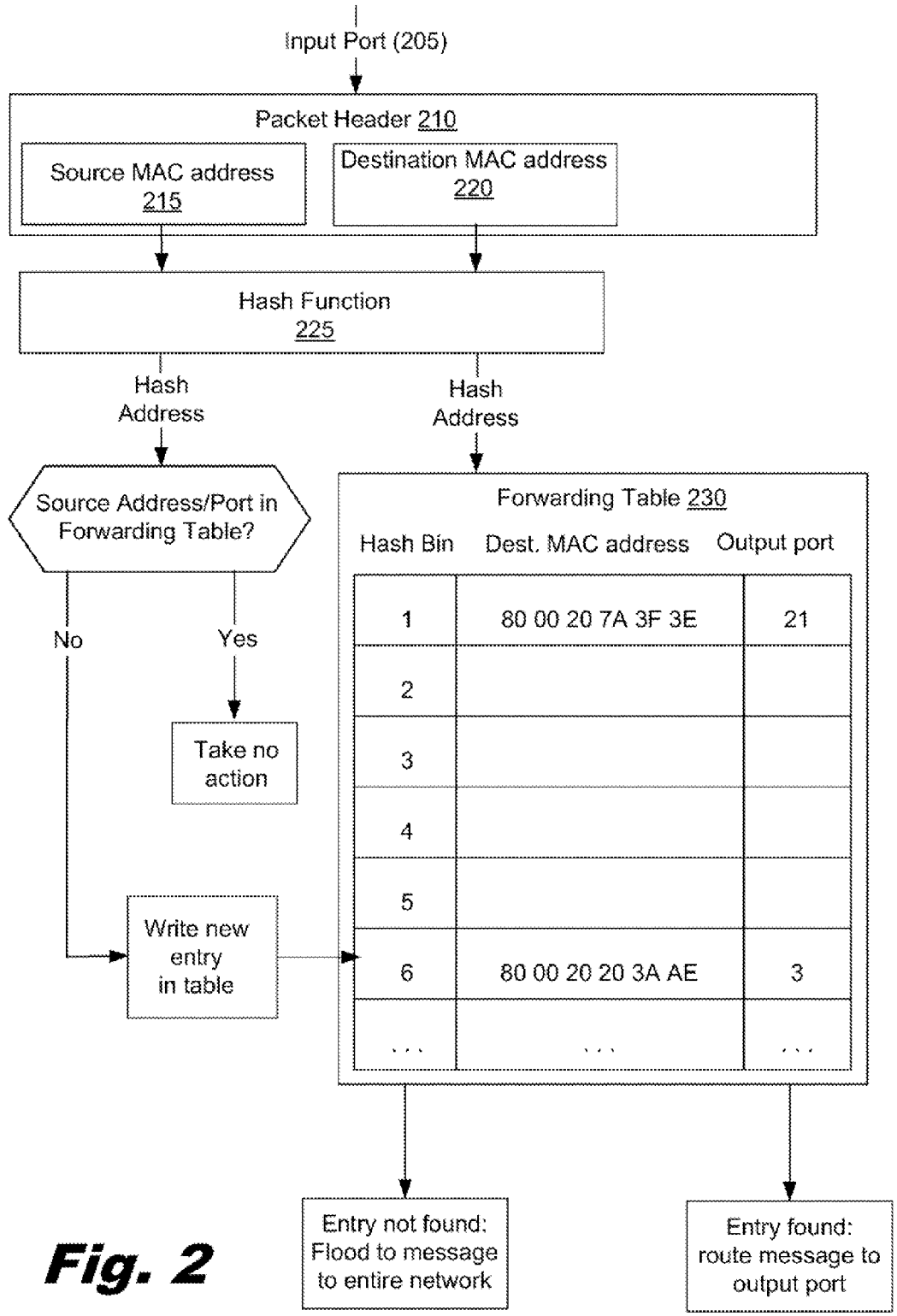
FIG. 2 is a diagram of an illustrative adaptive forwarding operation, according to one embodiment of principles described herein.

Adaptive forwarding has been developed to enhance communications efficiency using forwarding tables that learn the proper route to each destination. FIG. 2 is a diagram of an illustrative adaptive forwarding operation. Messages enter a switch through an input port (205). Each message contains a packet header (210) which is read by the switch. The switch extracts a source Media Access Control (MAC) address which uniquely identifies the end station sending the message and a destination MAC address which uniquely identifies the intended recipient end station. These two MAC addresses are the only information needed by adaptive forwarding.

Efficient hash mapping approaches have been developed to implement hardware lookup for adaptive forwarding. The hash function (225) performs a randomizing function that produces a consistent random value for each MAC address read. In a simple example, the hash function (310) may multiply the MAC address by a very large prime number and select ten digits from the result. These ten digits are a quasi-random number which can be consistently generated a given MAC address. Consequently, whenever the same MAC address is applied on input, the same random address is produced. The hash function allows fast lookup and even distribution of MAC addresses within the RAM address space. In one example system, the hash function reads a 48 bit MAC address and produces a 12 bit hash address. These hash addresses are mapped into a hash bin which corresponds to an entry within a forwarding table (230). As shown in FIG. 2, a hash bin in the forwarding table (230) may have a destination MAC address and corresponding output port for forwarding the message to the target end station. The destination MAC address contained within the hash bin is matched to the extracted destination MAC address to verify that the look up information is valid. The lookup result, if successful, identifies the unique forwarding port to the addressed end station.

In some circumstances, a hash bin may be empty. The hash bin may be empty for at least two reasons: either there is no target end station whose MAC address maps into the hash bin or the switch has not yet learned of the MAC address and destination port for the target end station. If a forwarding entry for the destination MAC address is not found, then the message is flooded to all active links except the link on which the message arrived.

The switch learns destination MAC addresses and corresponding ports by analyzing the source MAC address (215) of a received message. Because the source MAC address (215) is received on a known input port (205), the switch knows that the end station represented by the source MAC address (215) can be accessed through the known input port (205). The switch hashes the source MAC address (215) and checks the forwarding look up table (230) to determine an entry at the resulting hash address contains the proper MAC address and port information. If the correct forwarding table entry is found, no further action is taken. If the information is not found or is incorrect, the MAC address and port information is written to the forwarding table (230). Consequently, all subsequent messages destined for this new MAC address are forwarded only on the designated port. This procedure is used to adaptively create forwarding tables throughout large networks and results in a significant reduction of flooding within the network.

The Ethernet topology and adaptive forwarding method described above have a number of advantages. First, the spanning tree algorithm ensures that each end station within the network can communicate with any other end station. The spanning tree algorithm blocks redundant ports which could contribute to cycles within the network. When the network is reconfigured, such as when a new end station or link is added, the spanning tree algorithm can be re-run and a new and viable network topology can be automatically created. The spanning tree algorithm also allows a network to have self healing properties. If a link or switch becomes inoperable, the spanning tree algorithm is re-run, to find a new spanning tree which connects end stations within the network. Further, the messaging protocol provides an autonomous and reliable method for ensuring that messages are delivered to the destination end station. If a forwarding table entry is not found for the destination MAC address, the message is simply flooded to all the end stations on the network. The spanning tree topology then ensures that the message is delivered to all of the end stations within the network. Among those end stations, the proper destination end station will respond to the message. As the destination end station sends its confirmation that the message was received to the originating end station, one or more switches within the network have the opportunity to learn the correct port to communication with the previously unknown end station.

Figure 3:
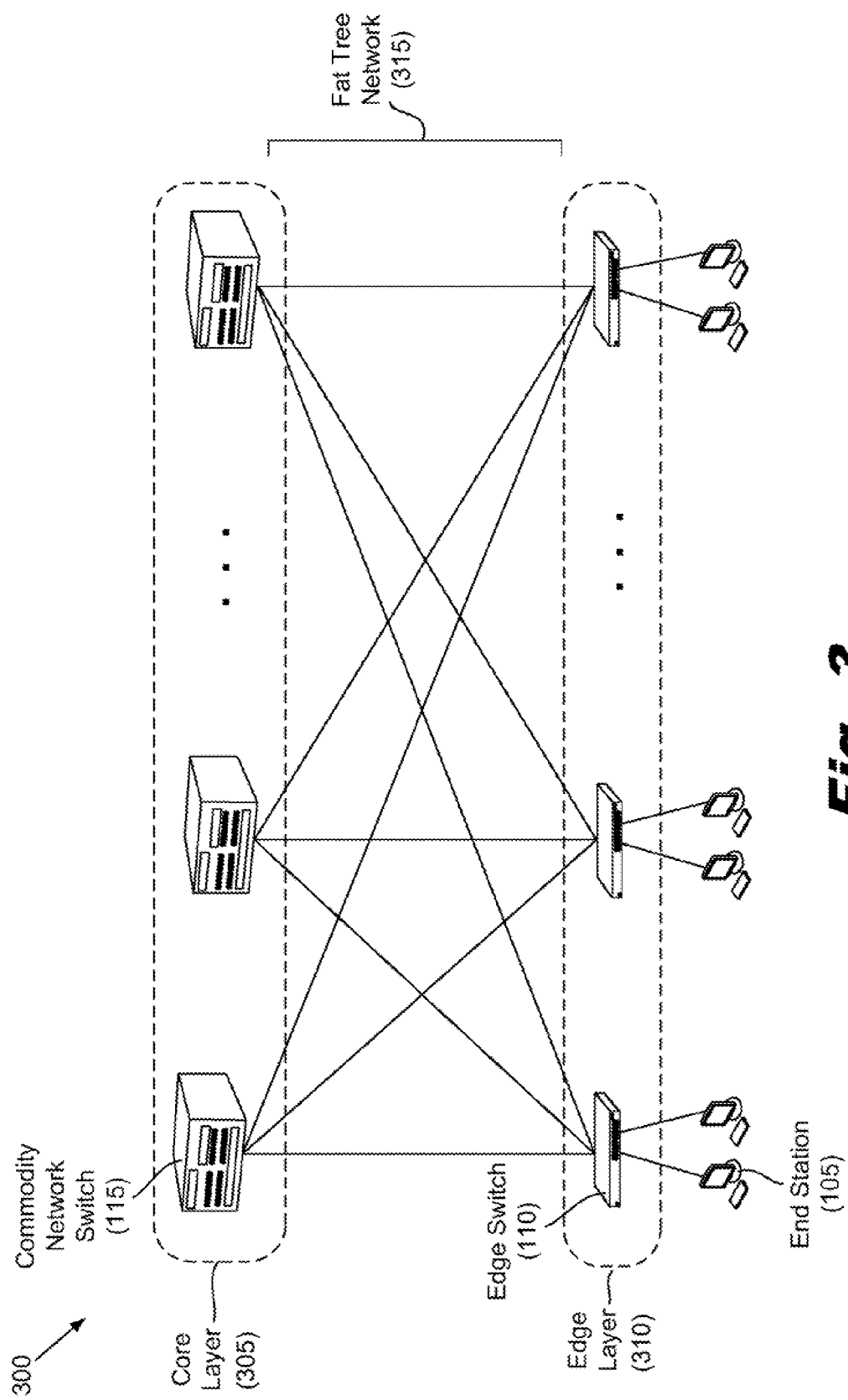
FIG. 3 is a diagram of an illustrative fat tree network, according to one embodiment of principles described herein.

However, the Ethernet network and spanning tree topology are heavily dependent on expensive core switches and are unable to utilize the aggregate transmission capacity of redundant connections. Alternative network topologies, such as fat trees, allow scaling bandwidth using redundant core switches. FIG. 3 is a diagram showing one illustrative fat tree network (300). A number of end stations (105) are connected to edge switches (110). The edge switches (110) are connected to several commodity network switches (115). The term "commodity network switches" refers to network switches for which there is a demand but are supplied at nominal prices and without qualitative differentiation across the market. The wide availability and standard capabilities of commodity network switches leads to smaller profit margins and diminishes the importance of factors (such as brand name) other than price.

The illustrative fat tree shown in FIG. 3, results in a two tiered network topology with significant redundancy. The edge switches (110) make up the edge layer (310) and the commodity network switches (115) make up the core layer (305). Such fat tree topologies reduce the need for costly root switches as multiple less expensive switches provide redundant communication paths which increase the performance, reliability, and flexibility of the network.

However, fat tree topologies can require significantly more management than spanning trees to prevent cycles and effectively utilize the redundant connections between the network components. In the past, a number of techniques have been used to manage fat tree networks. For example, network management techniques can be used to partition the network using layer-three internet protocol subnets or layer-two virtual local area networks. Both approaches limit the scope of flat layer two networks and assist in exploiting multiple paths. However, these approaches require complex and costly administration. Network partitioning does not work when performing datacenter-wide all-to-all communications for technical computing or performing parallel computations commonly used in search functions. Network partitioning also restricts virtualization which moves compute tasks to balance load and relies on the mobility of network addresses.

As described below, these limitations can be overcome to produce an Ethernet-based fat tree network that retains the benefits of a spanning tree and utilizes redundant connections to provide increase network capacity. The resulting scalable layer-two network has multi-path routing and eliminates costly root switches and complex management. The fat tree network utilizes control techniques that implement static and dynamic load balancing. Additionally, the fat tree network can be self-configuring and allow devices to move throughout the network without administration. The fat tree network utilizes enhanced edge switches without requiring modification of the core switches, which allows for commodity core switches from any vendor to be used.

Figure 4A:
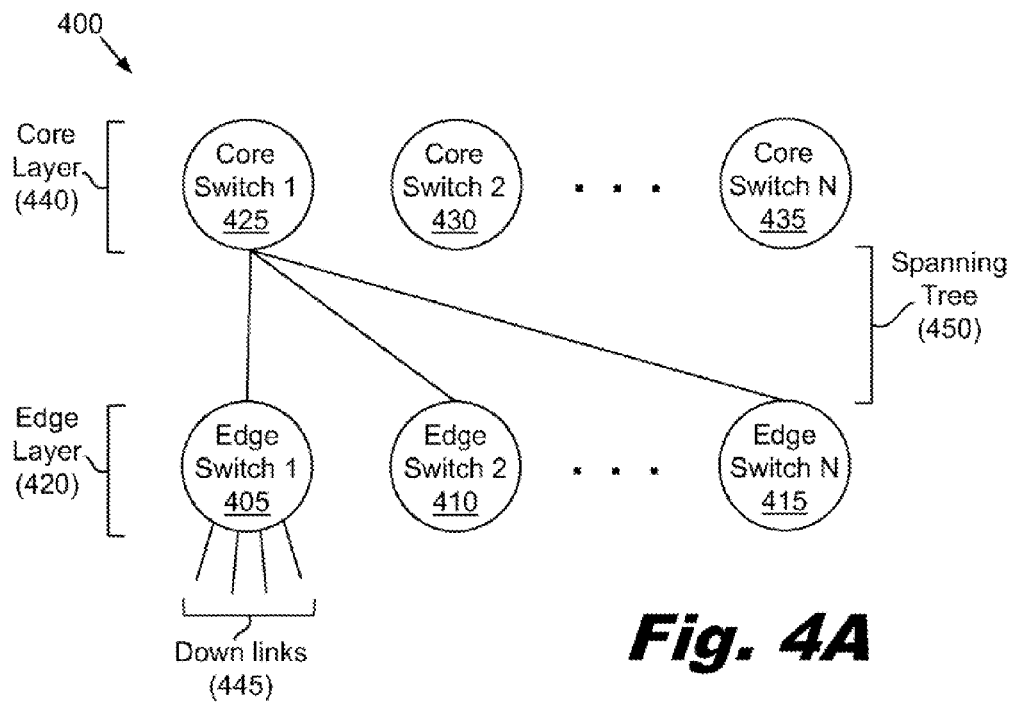
FIGS. 4A and 4B are diagrams which illustrate initialization steps for an illustrative fat tree network, according to one embodiment of principles described herein.

FIG. 4A is a diagram which shows an illustrative first step in configuring a fat tree network (400). A number of enhanced edge switches (405, 410, 415) are attached via down links (445) to end stations. Uplinks from the edge switches (405, 410, 415) connect the edge switches to the core switches (425, 430, 435). The edge switches (405, 410, 415) form the edge layer (420) and the core switches (425, 430, 435) form the core layer (440).

To initialize the topology, the redundant core switches must be excluded from the spanning tree protocol. For example, core switch 2 (430) through core switch N (435) could be turned off or disconnected. Alternatively edge switches (405, 410, 415) could disable spanning tree messages on links connecting to core switch 2 (430) through core switch N (435). A standard spanning tree algorithm is run to form a spanning tree (450), this spanning tree has a single connection to each of the edge switches (405, 410, 415). The resulting spanning tree does not include the redundant core switches, therefore eliminates the redundancies created by the multiple core switches (425, 430, 435).

Figure 4B:
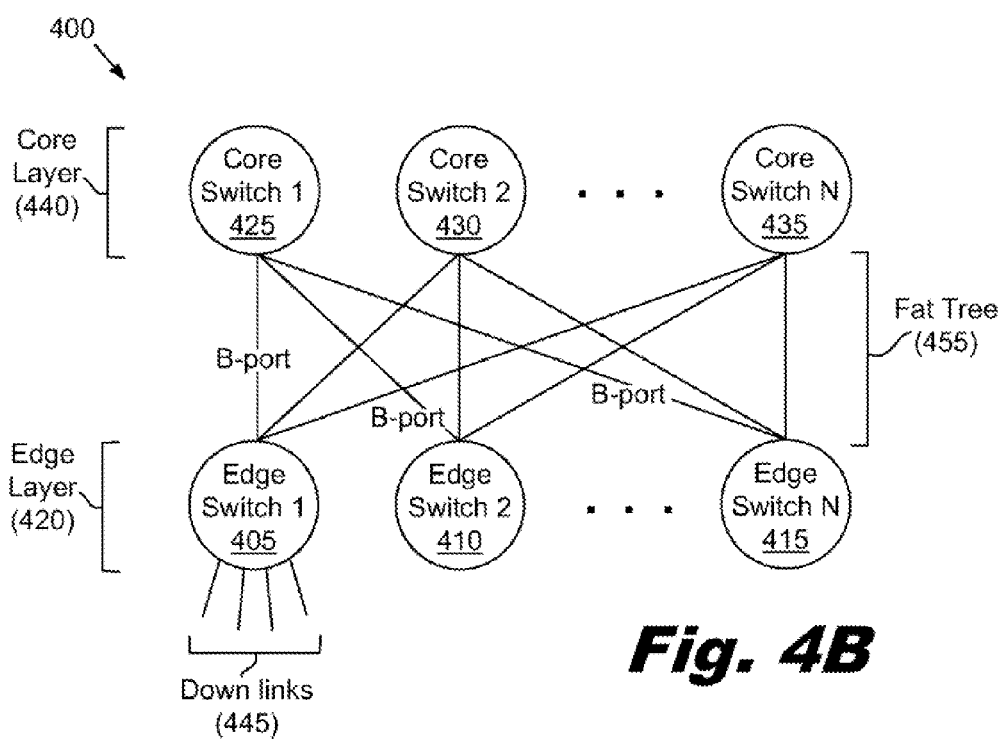

FIG. 4B shows an illustrative second step in configuring the fat tree network (400) in which the remaining core switches (430, 435) are turned on and establish connections with the edge layer (420). The initial connections formed by the spanning tree (450) are designated "B-ports." Consequently, each edge switch has a designated B-port and the spanning tree topology can be accessed by restricting uplink communications to the B-ports throughout the network.

This creates a fat tree network architecture (455) with multiple tiers which allows switches of fixed radix to scale to networks of arbitrary size and bisection bandwidth. When a message flows from a source to a destination, a sequence of uplink choices are confronted until a root switch is reached. For example, if an end station sends a message through a downlink (445) to edge switch 1 (405), there are three available uplinks, one to each of the core switches (425, 430, 435). The uplinked message eventually reaches core switch. In the example illustrated in FIG. 4B, the message only passes across a single link to reach a core switch. However, in other illustrative embodiments, the fat tree network structure may incorporate a more complex topology which includes multiple tiers. After reaching a core switch a sequence of downlink choices are confronted. At each tier, a single correct downlink is selected to reach the target end station.

Using the illustrative network shown in FIG. 4B as an example, if a end station attached to edge switch 1 (405) sends a message to an end station connected to edge switch N (415), there are at least three possible uplinks which can be used. Specifically, there are uplinks from edge switch 1 (405) to core switch 1 (425), core switch 2 (430), and core switch N (435). Any of the uplinks can result in successful delivery of the message to edge switch N (415). However, once one of the uplinks is selected and the message is received by a core switch, there is only one downlink which will correctly deliver the message to edge switch N (415). This downlink can be selected by the core switch using standard adaptive forwarding techniques described above. Consequently, no modification to the core switches (425, 430, 435) is required and any viable legacy or brand of core switch can be used in combination with the enhanced edge switches (405, 410, 415) to implement the illustrative network.

Figure 5:
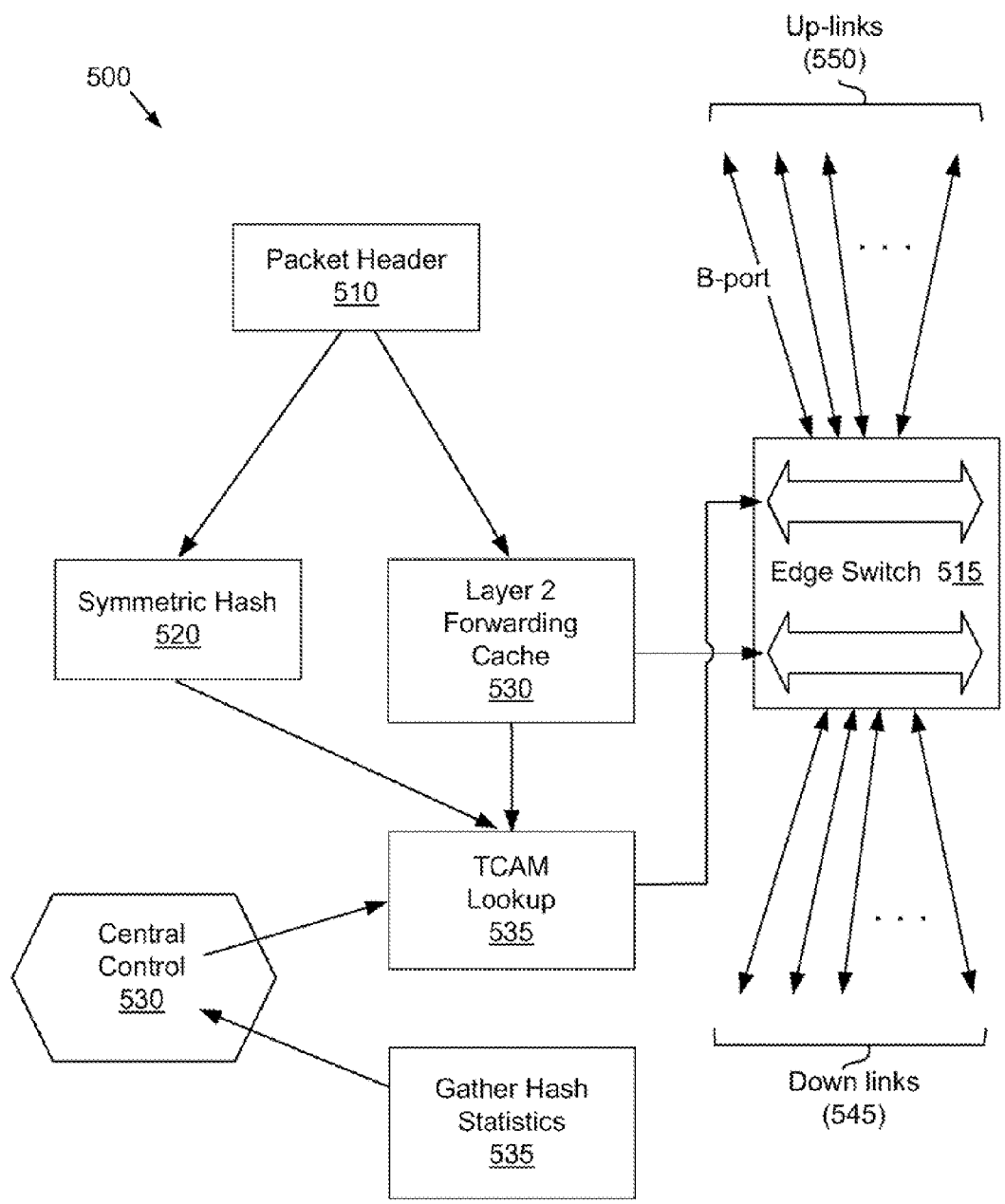
FIG. 5 is a diagram of a method for dynamically load balancing communication flows within a computer network, according to one embodiment of principles described herein.

By optimizing the selection of the various available uplinks, the fat tree network can utilize and control the redundant network paths to increase the overall efficiency and bandwidth of the network. FIG. 5 is a diagram of an enhanced edge switch (500) which is configured to utilize multiple communication paths and provide improved forwarding and load balancing.

According to one illustrative embodiment, the enhanced edge switch (500) receives a packet header (510) contained within an incoming message. The destination MAC address extracted and passed to a symmetric hash function (520) and layer 2 forwarding cache (530).

As described above, a hash function performs a randomizing function that produces a consistent hash class for each MAC address read. A symmetric hash function is a subclass of hash functions that ensures that after a message flows from a source to any destination, that path is retraced when a reply returns. For each message from source address s sent to destination address d, a symmetric hash function H(s, d) generates a single hash class x. The hash class x is allocated to a given uplink and the message is sent via that uplink. When the return message from d to s arrives at the switch, the hash function H(d, s) is applied which generates the identical hash class x and passes the message to proper downlink port. As described in the example above, symmetric hashes exhibit symmetric behavior such that H(s, d)=H(d, s). Consequently, each ordered data stream maps to a single class so that the stream traverses a single path. Thus, switches using traditional adaptive forwarding can learn port assignments needed to minimize flooding (broadcasting) to unknown end-stations locations. In the illustrative embodiment shown in FIG. 5, a symmetric hash function is used. However, an asymmetric hash function could also be used and a separate method for distributing locations and ports of end stations could be implemented.

For each packet, the forwarding cache is searched, using a MAC address to identify a forwarding port that may have been recorded when a prior message was received from the destination. This is adaptive forwarding process is described and illustrated in FIG. 2. However, the multi-path aware edge switch, the forwarding cache yields one of three results: the destination port is unknown, the destination port is a known downlink, or the destination port is any of the uplinks. For instances when the forwarding cache (530) yields a destination port which is a known downlink, the message is passed to this downlink and transmitted to the destination end station.

When the destination port is unknown, message would typically be flooded to all ports except the port that message was received on. However, according to one illustrative embodiment, the multi-path aware edge switch always identifies the "B-port" as the only uplink port on which the message is to be flooded. As discussed above, the B-ports identify the original spanning tree structure which is made up of a single link to each end station. The message is then flooded on the B-port as well as all downlinks (except the port on which the packet arrived). By utilizing the B-ports, flooded message is passed only on the original spanning tree structure. This avoids the unnecessary flooding of the redundant links within the network.

The forwarding cache treats a packet that arrives on any uplink as a packet that has arrived on the B-port. Thus, when a packet is forwarded back to a source address previously seen on any uplink, the forwarding cache returns the B-port as the result irrespective of which uplink carried the original packet. A Ternary Content-Addressable Memory (TCAM) lookup module (535) balances the communication streams among the uplinks by substituting a software chosen uplink port for each hash class. Content-Addressable Memory (CAM) is a special type of computer memory used in a specialized class of search applications. Unlike standard memory in which the user supplies a memory address and the memory returns the data word stored at that address, CAM is designed to search its entire memory to determine if that data word is stored anywhere in it. If the data word is found, the CAM returns a list of one or more storage addresses where the word was found and other associated pieces of data. Ternary CAM (TCAM) allows a third matching state of "X" or "Don't Care" for one or more bits in a stored data word, which adds flexibility to the search. For example, a TCAM might have a stored binary word of "10XX0" which will match any of the four search words "10000," "10010," "10100," or "10110." The fast searching action of the TCAM is utilized in network switches so that the destination address can be found in the table very quickly, reducing the switch's latency.

In this case, the forwarding port is selected in the subsequent TCAM lookup stage and may not be the same as the uplink port on which prior messages from the destination end station were received. A match key is formed that includes the port resulting from cache lookup and a symmetric hash. Each TCAM entry matches this key for a zero, one, or don't care in each of the processed bit positions. TCAM entries are set by software to balance load as described in the following example. Example switches have 4 uplinks. Software deposits 256 TCAM entries into each switch. Each entry matches 8 hash bits and 5 forwarding port bits. Each TCAM entry contains one of the possible 8-bit hash values. Each entry also identifies the B-port, and each entry selects the desired uplink for the given hash value. Packets destined for downlinks do not match the B-port field and no action results. Packets destined for any uplink match the B-port field, and the TCAM action substitutes the software chosen uplink port for each hash class.

To control the network, traffic measures are needed. Each switch samples packets and reports the data to a gather hash statistics module (535). The gather hash statistics module (535) increments a histogram entry for each packet's hash class. Separate data is collected for inbound and outbound directions on each uplink. According to one illustrative embodiment, a histogram entry is made for each packet. In an alternative embodiment, only a fraction of the packets are sampled and recorded. For example, only one out of one hundred packets may be sampled. By sampling only a fraction of the packets, a representative histogram may be created with significantly reduced overhead. Many TCAM implementations include hit count for each TCAM entry, in a third embodiment those hit counts are used to count the packets in each hash class and gather hash statistics.

A central controller (530) collects switch statistics to acquire data center wide measurements for load balancing. To load balance the data flows within the network, the central controller (530) analyzes the switch statistics and dynamically allocates the hash classes among the various uplinks. By shifting data flows away from a heavily loaded uplink to a lightly loaded uplink, the loads can be balanced such that the capacity and utilization of the overall system are improved. While each hash class can be placed independently on any uplink, each hash class is placed on the same uplink for each of the corresponding switches in the network to ensure that round trips traverse a common path.

A variety of algorithms can be used to optimize multi-path traffic within fat trees. For example, a greedy algorithm may be used to iterate across hash classes and optimize the uplink selection for each class after prior classes have been placed. In each step, an uplink is selected that minimizes the sum of traffic squared across all links. Minimizing square traffic places high penalties on the heavily loaded links. After all hash classes are assigned, the central controller downloads TCAM assignments for all switches.

Figure 6:
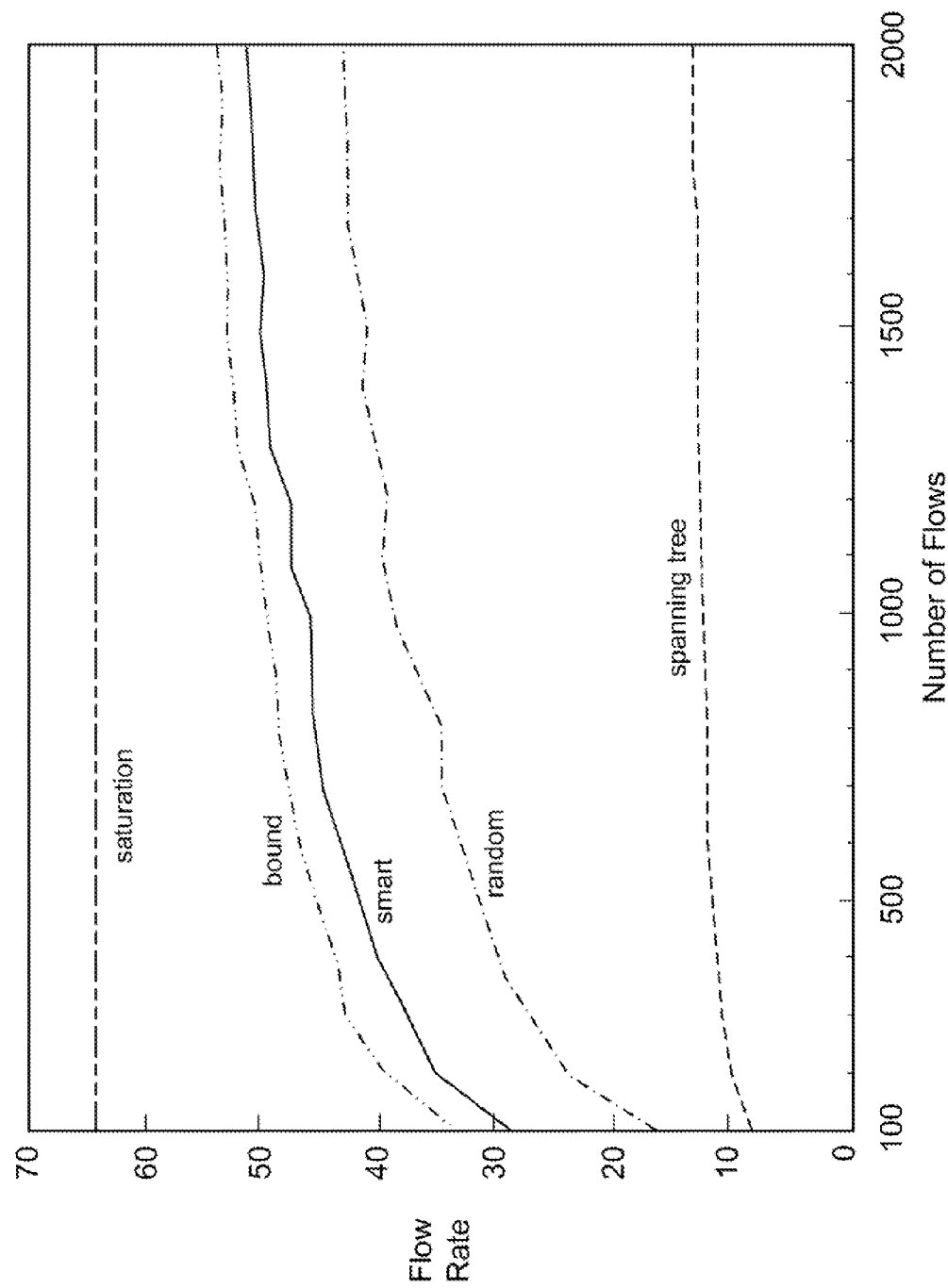
FIG. 6 is an illustrative graph of communication flow rates for a number of network configurations and load balancing algorithms, according to one embodiment of principles described herein.

FIG. 6 is a graph which compares various illustrative algorithms for load balancing Ethernet networks. The results illustrated in FIG. 6 were generated using a software-based model of the two-tiered fat tree architecture described above. While the software model does not produce real system dynamics, it does demonstrate potential benefits for on-line optimization. The horizontal axis of the graph shows the number of data flows of within the network and the vertical axis shows the total flow rate within the network.

The model tested relatively simple heuristics and assumed that traffic on the network varied slowly over time. Parameters included in the model included the number of root switches, leaf switches, and downlinks. The model included a fat tree network having: 4 root switches, 16 leaf switches, 16 downlinks, and 256 TCAM entries. Random flows are added in 20 increments of 100 flows. The flow rate is measured as unit load flows completed per unit time. Data for each curve has been smoothed by averaging over 10 independent experiments. Transmission begins when a number of flows begin crossing the network using the chosen policy. Flows compete for bandwidth on each link and delivery is proportionally delayed when flows share a common link. Transmission ends when a final flow completes. Aggregate bandwidth is calculated by summing the load over all flows and dividing by the transmission time. Each leaf has a single uplink to all roots and all links were assumed to have unit capacity. The number of TCAM entries is also parameterized and is increased to enhance fine-grained routing decisions. Each link is bidirectional, and inbound and outbound resources are independently modeled. The model generates a number of unit load flows from a random source to a random destination.

Flows were routed using one of three different algorithms. The spanning tree algorithm used the B-ports for uplink traffic and thus used a single root switch. This simulates a spanning tree architecture, which does not allow redundant connections between network components. The spanning tree results are shown by the dashed line on the lower portion of the graph. The random algorithm used a round-robin mapping of TCAM entries to uplinks. When the number of entries is a multiple of the number of root switches, this corresponds to an equal assignment of random classes to uplinks. The flow rate results produced by the random algorithm are shown as a dot-dash line labeled "random."

A smart method applies an optimization algorithm that samples traffic and optimizes routing for that traffic. In this example; the smart method applied the greedy heuristics algorithm described above. The results are shown on the graph as a solid line which is labeled "smart." Both the random and smart implementations for network routing significantly improved the flow rate of data within the modeled network. For example, for 1000 flows, the spanning tree had a flow rate of 10, while the random routing method had a flow rate of approximately 40 and the smart routing method had a flow rate of approximately 47.

Two performance bounds are shown. The saturation bound is the horizontal line at the top of the graph labeled "saturation." This bound was generated when all uplinks were saturated. The modeled network cannot transport more than (leaf switches)×(root switches)=64 flows per unit time. Another bound was calculated for a set of flows that have a maximal uplink requirement on some edge switch. This bound is a dot-dot-dash line labeled "bound." The total number of flows that traverse that edge switch's uplinks divided by the number of uplinks provides this bound.

The experiment shown above is representative of the overall behavior of the fat tree network. Consistently, for a modest number of large flows (a.k.a. elephants), active management produces large performance gains. When a vast number (e.g. 100,000) of small flows (a.k.a. mice) are modeled, both "smart" and "random" implementations produce near optimal ("saturation") results.

These results are not intended to represent the quantitative performance of a fat tree network. Rather, the results are intended to qualitatively illustrate the potential benefits of fat tree architectures that incorporate enhanced edge switches. The actual performance of a network may depend on a number of factors, including the capacity of the components which make up the network, the number and type of flows within the network, and the algorithms used to manage the network.

In addition to the simple heuristics described above, more sophisticated algorithms could be utilized to further improve the performance of the network. Further, various on-line approaches could be used which incrementally update TCAMs to more efficiently accommodate dynamically changing traffic. According to one illustrative embodiment, the principles described above could be used to support converged fabrics that combine LAN and storage traffic. This could be accomplished using the fat tree architecture's ability to control connection placement without per-flow administration, which could provide a powerful tool to control both segregation and load balancing for managing mixed local area network (LAN) and storage traffic.

Figure 7:
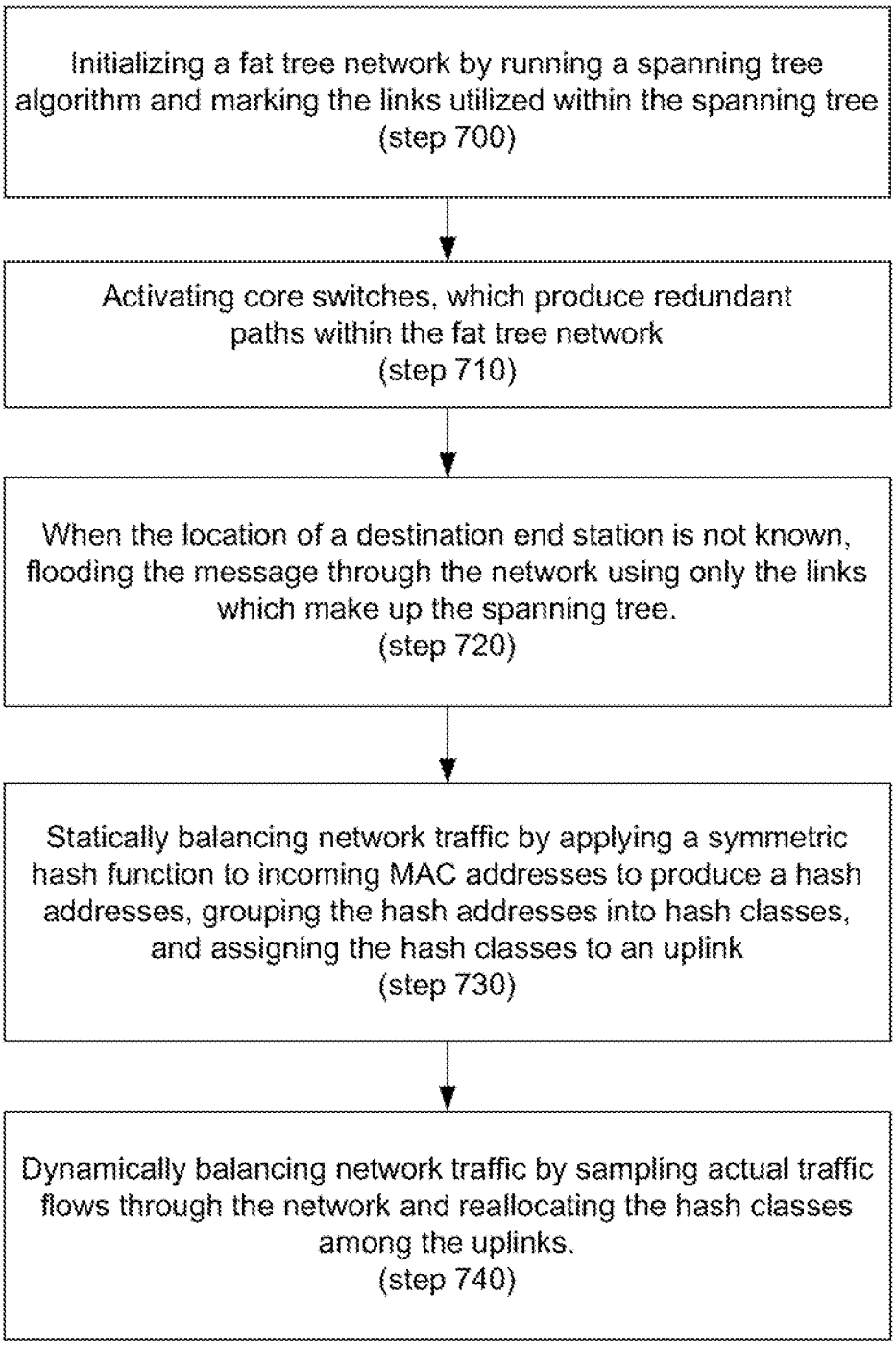
FIG. 7 is a flowchart of an illustrative method for allocating data flows within a fat tree network, according to one embodiment of principles described herein.

FIG. 7 is a flow chart which describes an illustrative method for load balancing Ethernet networks in a fat tree network. The fat tree network is initialized by running a spanning tree algorithm and marking the links which make up the spanning tree (step 700). The balance of the core switches are then activated, which produces the redundant paths within the fat tree network (step 710). When the location of a destination end station is not known, the message is flooded through the network using only the links which make up the spanning tree (step, 720). Static balancing of the communication flows within the network is accomplished by applying a symmetric hash function to incoming MAC addresses to produce consistent random hash addresses. These hash address are grouped into hash classes, which are assigned to one of several available uplinks (step 730). Dynamic balancing of the communication flows within network is accomplished by sampling actual traffic flows through the network and reallocating the hash classes among the uplinks (step 740).

In sum, this enhanced fat tree network preserves minimal management needs of traditional layer-two Ethernet, while extending these networks to support multi-path scalability. The fat tree network utilizes control techniques that implement static and dynamic load balancing. Additionally, the fat tree network can be self-configuring and allows devices to move throughout the network without administration. The fat tree network utilizes enhanced edge switches without requiring modifying to core switches, which allows for commodity core switches from any vendor to be used.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for load balancing Ethernet traffic within a fat tree network comprising:
randomly assigning incoming messages into hash classes using a hash function;
programming the assignment of said hash classes among uplinks based on data center wide load balancing measurements; and
transmitting said incoming messages on said uplinks according to said hash class.

2. The method of claim 1, further comprising dynamically allocating said hash classes among uplinks in response to a measurement of network traffic.

3. The method of claim 1, further comprising:
initializing said fat tree network using a spanning tree algorithm to generate a spanning tree network comprising spanning tree links; and then
activating previously disconnected core switches which create redundant links.

4. The method of claim 3, further comprising flooding information through said fat tree topology using said spanning tree links.

5. The method of claim 4, further comprising flooding information through only the original spanning tree structure.

6. The method of claim 3, in which the core switches are turned off while generating a spanning tree network.

7. The method of claim 3, in which the initialized fat tree network has a single connection to each of the edge switches.

8. The method of claim 3, in which activating core switches which create redundant links comprises turning on remaining core switches.

9. The method of claim 1, further comprising:
gathering hash statistics across said fat tree network; and
reporting said hash statistics to a central controller.

10. The method of claim 9, further comprising:
evaluating said hash statistics using said central controller; and
dynamically setting an allocation of said hash classes among said uplinks to balance said Ethernet traffic within said fat tree network.

11. The method of claim 1, further comprising setting said allocation of said hash classes among said uplinks such that individual flows follow the same outbound and inbound paths.

12. The method of claim 1, further comprising allocating said hash classes among said uplinks is performed according to a greedy heuristic algorithm.

13. The method of claim 1, further comprising allocating said hash classes among said uplinks is performed according to a random algorithm.

14. The method of claim 1, further comprising down linking messages from a root switch to an edge switch is performed using an adaptive forwarding technique.

15. The method of claim 1, further comprising:
statically balancing loads within said fat tree network; and
dynamically balancing loads within said fat tree network.

16. The method of claim 1, in which the hash class is assigned based on a destination address of an incoming message.

17. A fat tree network having load balancing of communication flows comprises:
end stations;
enhanced edge switches; said enhanced edge switches having downlinks to said end stations and using a hash module to categorize incoming messages into hash classes; and
commodity core switches; said enhanced edge switches having uplinks to said commodity core switches, said hash classes being dynamically allocated to said uplinks to load balance said communication flows within said fat tree network based on network traffic information gathered across said fat tree network.

18. An enhanced network switch for load balancing communication flows in a fat tree network comprising:
downlinks;
uplinks, said enhanced network switch being configured to:
route communication flows among said downlinks and uplinks;
receive a MAC address from a message; and
output a hash address;
a TCAM lookup module; said TCAM lookup module allocating said hash address into a hash class and allocating said hash class to one of said uplinks;
a forwarding cache to receive said hash address and look up a corresponding destination port;
wherein one of said uplinks is a designated link, said designated link being a link with an underlying spanning tree network; if said hash address does not correspond to said destination port, then said message is flooded preferentially on said designated link.

19. The network switch of claim 18, further comprising:
a central controller; and
wherein said enhanced network switch gathers hash statistics which measure the load balance among said uplinks and reporting said hash statistics to said central controller;
wherein said central controller dynamically sets an allocation of said hash classes among said uplinks.

20. The network switch of claim 18, in which the hash address is output from a symmetric hash function.

* * * * *